United States Patent [19]

Thigpen

[11] 4,367,547
[45] Jan. 4, 1983

[54] APPARATUS FOR HOLDING RECORD DISKS BY VACUUM

[75] Inventor: Bruce Thigpen, Tallahassee, Fla.

[73] Assignee: Wayne H. Coloney Co., Inc., Tallahassee, Fla.

[21] Appl. No.: 260,453

[22] Filed: May 4, 1981

[51] Int. Cl.³ .............................................. G11B 3/60
[52] U.S. Cl. .................................. 369/271; 346/137; 360/86; 360/97
[58] Field of Search ...................... 369/270, 271, 264; 360/86, 97, 98, 99; 346/137; 269/21; 51/131.4, 235

[56] References Cited

U.S. PATENT DOCUMENTS

| | | | |
|---|---|---|---|
| 793,140 | 6/1905 | Manwaring | 369/270 |
| 1,062,579 | 5/1913 | Aylsworth | 369/270 |
| 2,146,519 | 2/1939 | Zimmerman | 369/271 |
| 2,601,301 | 6/1952 | Klein et al. | 369/191 |
| 3,313,548 | 4/1967 | Moore et al. | 369/74 |
| 3,608,909 | 9/1971 | Rabinow | 369/270 |
| 3,936,880 | 2/1976 | McGinnis et al. | 360/86 |
| 3,980,308 | 9/1976 | Camerik et al. | 369/271 |
| 4,065,135 | 12/1977 | Doughty | 369/270 |
| 4,234,195 | 11/1980 | Shibata | 369/270 |

*Primary Examiner*—Steven L. Stephan
*Attorney, Agent, or Firm*—Dowell & Dowell

[57] ABSTRACT

An apparatus for holding a record disk in fixed position on a turntable while the record is being played. The apparatus includes an air seal and a foraminous pad mounted on a turntable which engages the bottom of the record and a vacuum chuck with a rotatable fitting which is connected to a source of vacuum and is mounted on top of the record so that a vacuum is applied to the bottom of the record disk through the central opening by a fixture located above the record.

5 Claims, 3 Drawing Figures

APPARATUS FOR HOLDING RECORD DISKS BY VACUUM

TECHNICAL FIELD

This invention relates generally to apparatus for holding a relatively flat object in fixed position and relates particularly to apparatus for holding a record disk on a turntable while the turntable is rotating and the record disk is being played.

BACKGROUND ART

In the past, turntables for record players and the like have been coated with flock, felt or other fiberous matter to retain the record disk in position while the pickup tone arm and the needle traversed the disk and reproduced the sound through one or more amplifiers and speakers. As the record player equipment became more sophisticated and more sensitive, acoustical and mechanical feedback became evident and it was determined that at least a portion of the feedback was the result of slight movement of the record disk relative to the turntable.

Some efforts were made to hold the record disk in fixed position and these efforts included the evacuation of air from the bottom of the record disk so that atmospheric pressure would apply a downward force on the disk to hold the disk in fixed position on the turntable. However, most of these efforts caused the evacuation of air from below the record disk and therefore, could not be readily applied to existing record playing equipment. Some examples of this type of structure are shown in U.S. patents to Manwaring U.S. Pat. No. 793,140; Aylsworth U.S. Pat. No. 1,062,579; Rabinow U.S. Pat. No. 3,608,909; and Doughty U.S. Pat. No. 4,065,135.

Other efforts to hold the disk in position included the placing of a weight or the like on top of the record disk to hold the disk in position. Some examples of this type of structure are shown in U.S. patents to Zimmerman U.S. Pat. No. 2,146,519 and Camerick et al U.S. Pat. No. 3,980,308.

DISCLOSURE OF THE INVENTION

The present invention is embodied in an apparatus for evacuating air from an area below a record disk so that the disk will be held in fixed position on a turntable or the like by atmospheric pressure. The evacuation of air is accomplished from the upper side of the record disk so that the apparatus may be easily applied to existing equipment or may be used on currently manufactured equipment. The apparatus includes an air seal and a relatively soft foraminous pad which are mounted on a conventional turntable or the like in a position to engage the bottom surface of the record disk. A vacuum chuck having a rotatable fitting connected to a vacuum pump or other source of negative air pressure is placed on the upper surface of the disk so that the air below the record disk is evacuated through the central spindle opening of the record.

BEST MODE FOR CARRYING OUT THE INVENTION

Figure 1:
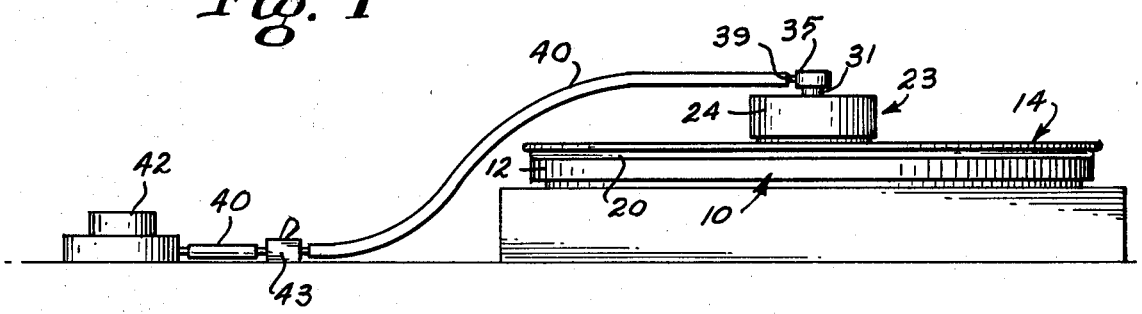
FIG. 1 is a side elevational view illustrating one application of the invention.
Figure 2:
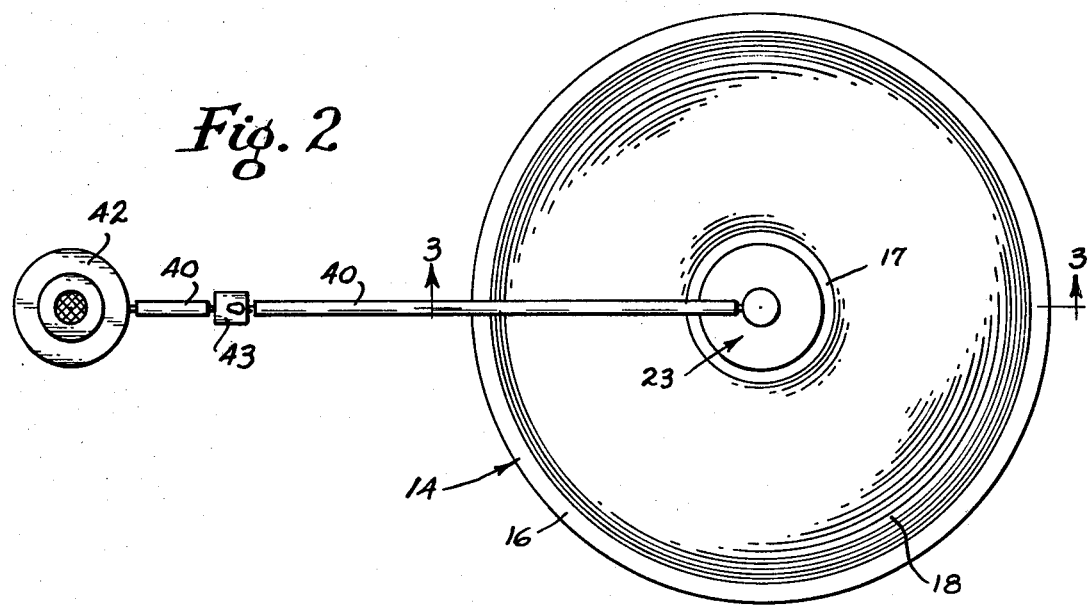
FIG. 2 is a top plan view thereof.
Figure 3:
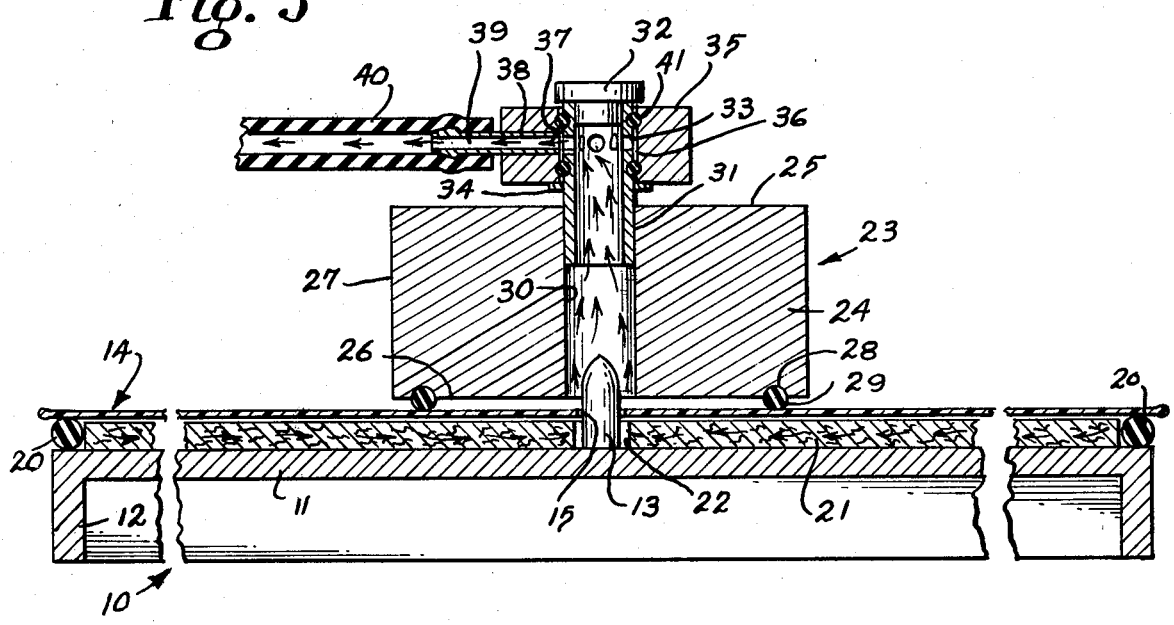
FIG. 3 is an enlarged fragmentary vertical sectional view taken on the line 3—3 of FIG. 2.

With continued reference to the drawing, a turntable 10 of conventional construction includes a substantially flat imperforate platen 11 having a depending edge or flange 12. A spindle 13 is fixed to the center of the platen 11 and extends axially upwardly therefrom. The turntable 10 is rotatably driven in any conventional manner (not shown). A record disk 14 having a central opening 15 which is slightly larger in diameter than the diameter of the spindle 13 normally is placed on the platen and is rotated thereby while the stylus of a pickup tone arm (not shown) engages the grooves on the upper surface of the record disk in a conventional manner. Each of the upper and lower surfaces of the record disk has an annular blank portion or lead in 16 adjacent to the outer periphery and an inner blank portion 17 at the center where the title and other indicia are located. The area between the outer and inner blank portions is provided with a plurality of grooves or tracks 18.

In order to hold the record disk 14 in fixed position relative to the platen 11, an annular ring 20 of imperforate resilient material is adhered or otherwise secured to the platen 11 adjacent to the outer periphery thereof. The ring 20 functions as an air seal when a record disk is placed thereon. A generally flat foraminous pad 21 is disposed within the ring 20 and such pad is constructed of felt or other resilient material such as open cell foam rubber or plastic material. The pad preferably has an outer diameter which is substantially the same as or slightly less than the inner diameter of the ring 20 and a thickness which is slightly less than the thickness of such ring. If desired, the pad 21 may be adhered to the platen 11. The pad 21 includes a central opening or annulus 22 of a diameter to provide a concentric space about the spindle 13.

A vacuum chuck 23 is mounted on the upper surface of the record disk 14 and such chuck includes a generally cylindrical body 24 having upper and lower walls 25 and 26 respectively and a side wall 27. Such cylindrical body has a diameter which is less than the diameter of the inner blank portion 17 of the record disk so as not to interfere with playing of the record disk. The lower wall 26 is provided with a circular recess 28 which receives a continuous ring 29 of imperforate resilient material which forms an air seal when engaging the record disk 14. The body 24 includes an axial bore 30 of a diameter substantially larger than the diameter of the spindle 13. Such body has sufficient weight that the ring 28 seals against the upper surface of the record disk 14 and the lower surface of such disk seals against the annular ring 20.

A hollow sleeve 31 is secured to the walls of the bore 30 in air tight relationship and extends axially upwardly above the upper wall 25 of the body. The upper end of the sleeve 31 is closed in any desired manner as by a cap 32 and the upper portion of the sleeve is provided with one or more perforations or openings 33 which are spaced from the cap. A collar 34 is attached to the outer periphery of the sleeve 31 above the body 24 and such collar supports a rotary fitting 35 having an axial bore 36 which is larger in diameter than the outer periphery of the sleeve 31 and defines an annulus 37 therebetween.

The fitting 35 is provided with an opening 38 normal to the axis of the sleeve and such opening receives a nipple 39 which extends outwardly of the fitting 35 to a position to be received within one end of a flexible air hose 40. The fitting 35 is rotatably mounted about the sleeve 31 in air tight relationship by air seals 41 located on opposite sides of the openings 33 so that air under atmospheric pressure is precluded from the annulus 37.

The opposite end of the hose 40 is connected to a vacuum pump or other source of negative pressure 42 and, preferably, an air switch 43 is interposed along the length of the hose 40.

INDUSTRIAL APPLICABILITY

After the annular ring 20 and the foraminous pad 21 have been mounted on the upper surface of the platen 11, a record disk 14 is placed on such ring and pad with the central opening of the disk receiving the spindle 13 and being guided thereby. Then the vacuum chuck 23 is placed on the upper surface of the record disk in such a manner that the outer periphery of the body 24 is located above the central blank portion 17 of the record disk. Before the tone arm of the record player is activated, the vacuum pump 42 is energized and the air switch 43 is moved to the "on" position. The vacuum pump evacuates the air from the hose and causes air to flow from the area below the record disk through the foraminous pad 21 into the central opening or annulus 22 and then upwardly through the central opening 15 of the record into the bore 30 of the body 24. From the bore 30, the air flows through the sleeve 31 and the openings 33 into the annulus 37 and then through the nipple 39 into the hose 40 where it is discharged to the atmosphere by the air pump 42. When the air is evacuated from the area below the record disk, atmospheric pressure forces the record disk downwardly into intimate engagement with the seal ring 20 and the foraminous pad so that the record disk is substantially fixed relative to the turntable 10. After the record disk has been played and the tone arm has returned to its retracted position, the air switch 43 is moved to the "off" position and the vacuum chuck 23 is tilted slightly to permit air under atmospheric pressure to enter the chuck and, hence, into the area below the record disk so that the chuck and the record disk may be removed.

I claim:

1. Apparatus for holding a disk having an opening in substantially fixed position on a platen comprising air seal means mounted on the platen, a foraminous pad carried by the platen and being located within the confines of said air seal means, the outer limits of said air seal means being less than the outer limits of a record disk that is placed thereon, a vacuum chuck means adapted to be placed on the disk, said chuck means including a body having a bore which communicates with the opening in the disk, and means for evacuating air from the bore of said vacuum chuck means, whereby atmospheric air from below the disk is evacuated through the opening in the disk and through said chuck means so that air under atmospheric pressure on one side of the disk forces the disk into intimate engagement with said air seal and said pad and substantially prevents relative movement between the disk and the platen.

2. Apparatus for holding a disk having an opening in substantially fixed position on a platen comprising air seal means mounted on the platen, a foraminous pad carried by the platen and being located within the confines of said air seal means, the outer limits of said air seal means being less than the outer limits of a record disk that is placed thereon, a vacuum chuck means adapted to be placed on the disk, said chuck means including a body having a bore which communicates with the opening in the disk, a fitting rotatably mounted on a portion of said body, means providing fluid communication between said bore of said body and said fitting, discharge means on said fitting, a hose means connected at one end to said discharge means, the opposite end of said hose means being connected to a source of vacuum, whereby atmospheric air from below the disk is evacuated through the opening in the disk and through said chuck means and said fitting so that air under atmospheric pressure on one side of the disk forces the disk into intimate engagement with said air seal and said pad and substantially prevents relative movement between the disk and the platen.

3. The structure of claim 2 in which said vacuum chuck means includes a sleeve having one end mounted on said body and communicating with the bore thereof, said means providing fluid communication between said body and said fitting including at least one opening in said sleeve, said fitting having an axial bore disposed about said sleeve and spaced therefrom and defining an annulus in communication with the opening in said sleeve, and second seal means between said sleeve and said fitting.

4. The structure of claim 2 in which said foraminous pad has an opening aligned with the opening in the disk.

5. Apparatus for holding a record disk having an opening on a turntable having a platen comprising a first air seal means mounted on said platen, a foraminous pad mounted on said platen within the confines of said air seal means, the thickness of said pad being no more than the thickness of said first air seal means, said pad having a central opening aligned with the opening in the record disk, said first air seal means being of a size to engage one surface of the disk, chuck means including a body having an axial bore, said body having a second air seal means of a size to engage another surface of said disk, sleeve means connected at one end to said body and communicating with said bore of said body, the other end of said sleeve extending outwardly from said body, means for closing said other end of said sleeve, at least one opening in said sleeve intermediate said ends, a fitting rotatably carried by said sleeve, said fitting having an axial bore spaced from said sleeve and defining an annulus in communication with the opening in said sleeve, third air seal means intermediate said sleeve and said fitting and extending across said annulus, nipple means carried by said fitting and communicating with the annulus, hose means connected at one end to said nipple means, and vacuum pump means connected to the opposite end of said hose means, whereby operation of said vacuum pump means evacuates air from said foraminous pad so that the record disk is held on said pad by atmospheric pressure.

* * * * *